(12) United States Patent  
Delker et al.

(10) Patent No.: US 8,818,986 B1
(45) Date of Patent: Aug. 26, 2014

(54) ONBOARD ADVANCE SEARCH REFINEMENT

(75) Inventors: Jason R. Delker, Olathe, KS (US); Jason K. Whitney, Lee's Summit, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 97 days.

(21) Appl. No.: 13/191,448

(22) Filed: Jul. 27, 2011

(51) Int. Cl.
*G06F 17/30* (2006.01)

(52) U.S. Cl.
USPC ............ 707/708; 707/713; 707/733; 707/734

(58) Field of Classification Search
None
See application file for complete search history.

(56) References Cited

U.S. PATENT DOCUMENTS

| | | | |
|---|---|---|---|
| 2008/0005068 A1* | 1/2008 | Dumais et al. | 707/3 |
| 2009/0144624 A1* | 6/2009 | Barnes, Jr. | 715/719 |
| 2010/0306215 A1* | 12/2010 | Azar et al. | 707/759 |
| 2011/0055186 A1* | 3/2011 | Gopalakrishnan | 707/706 |
| 2011/0161176 A1* | 6/2011 | Ai | 705/14.66 |
| 2011/0179064 A1* | 7/2011 | Russo | 707/769 |
| 2012/0030199 A1* | 2/2012 | Mohajer | 707/723 |
| 2012/0089482 A1* | 4/2012 | Patel | 705/26.41 |
| 2012/0117057 A1* | 5/2012 | Adimatyam et al. | 707/723 |
| 2012/0143498 A1* | 6/2012 | Zubas et al. | 701/438 |

* cited by examiner

*Primary Examiner* — Anh Tai Tran

(57) ABSTRACT

A method of refining a search comprising receiving, by a mobile communication device, a user input, the user input defining a search request; refining, by the mobile communication device, the search request based on a user profile; sending, by the mobile communication device, the refined search request to a search engine; receiving, by the mobile communication device, a search result from the search engine; displaying, by the mobile communication device, the search result.

19 Claims, 5 Drawing Sheets

ONBOARD ADVANCE SEARCH REFINEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user of a computer or a portable electronic device may search the internet for information via a variety of search engines. A search engine (e.g. Google) may search the internet for content, based on search criteria such as keywords or text that have been entered by the user. The search engine may find and collect links to access and retrieve relevant content, such as uniform resource locators (URL's) related to the search criteria, and return the URL's to the user. The user may then select one or more of the returned URL's to explore, in order to find the information they requested.

SUMMARY

In an embodiment, a method of refining a search is disclosed. The method comprises receiving, by a mobile communication device, a user input, the user input defining a search request; refining, by the mobile communication device, the search request based on a user profile; sending, by the mobile communication device, the refined search request to a search engine; receiving, by the mobile communication device, a search result from the search engine; displaying, by the mobile communication device, the search result.

In an embodiment, a device for refining search results is disclosed. The device comprises a radio transceiver; a memory; a processor coupled to the memory; and an application stored in the memory that, when executed by the processor, receives a user input, the user input defining a search request; sends the search request via the radio transceiver to a search engine; receives a result from the search engine; refines the search result, based at least on a user profile; displays the refined search result on the mobile device.

In an embodiment, a method of refining a search is disclosed. The method comprises receiving, by a first mobile communication device, a user input, the user input defining a search request; sending, by the first mobile communication device, the search request to a search engine; receiving, by the first mobile communication device, a search result from the search engine; refining, by the first mobile communication device, the search result based at least on a user profile; displaying, by the first mobile communication device, the refined search result.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
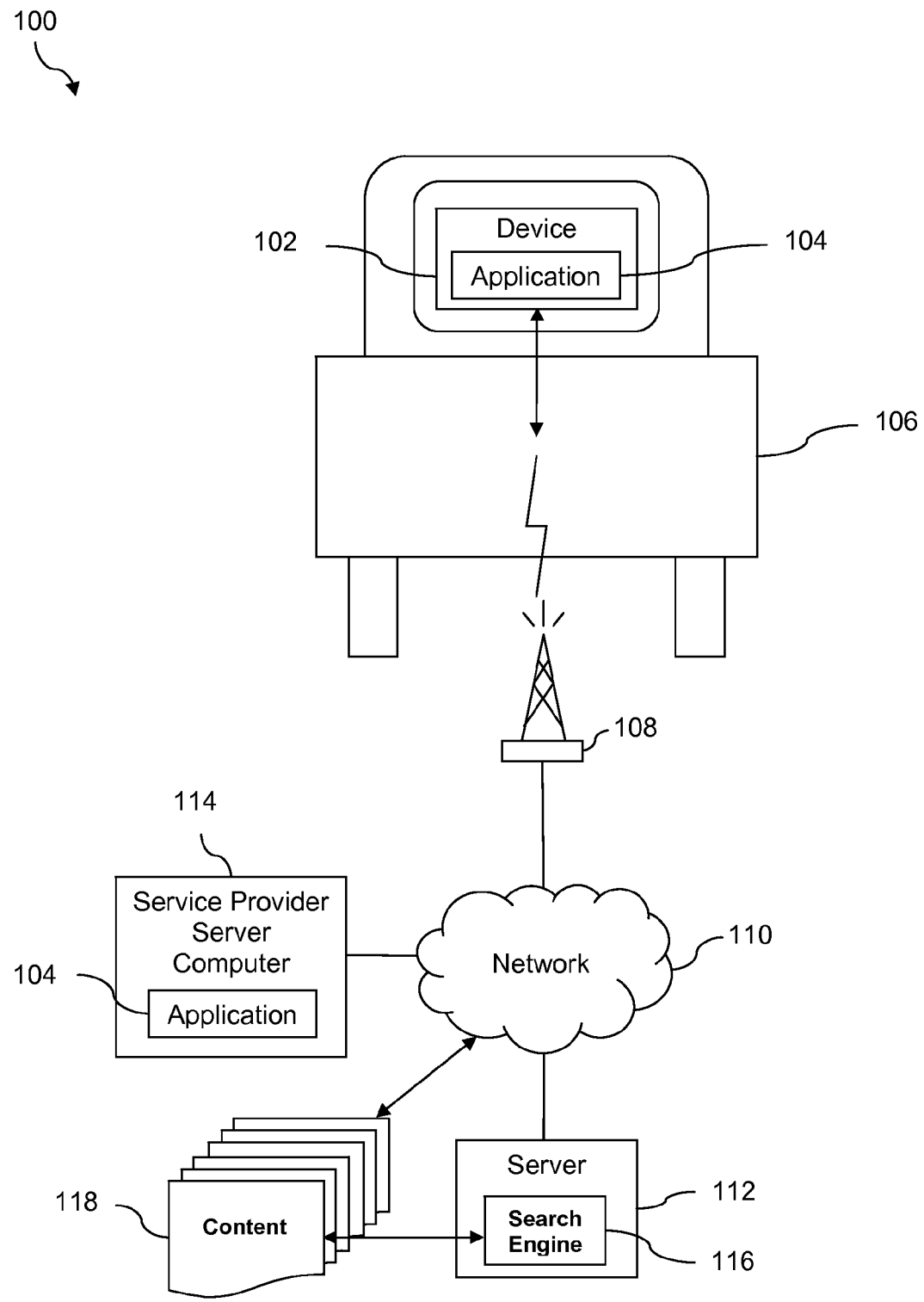
FIG. 1 illustrates a wireless communication system, according to an embodiment of the disclosure.

It should be understood at the outset that, although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Herein, the term "mobile device" may be used to describe any of numerous forms of mobile communications and/or computing devices. Devices such mobile phones, portable computers, personal digital assistants, wireless-enabled vehicles such as cars and trucks, and/or other portable devices that are capable of communicating wirelessly with a network or with another mobile device are all contemplated by the term "mobile device". In addition, the term "provider" may be used to indicate a cell phone provider, a cell phone manufacturer, a provider of mobile communications services, or other such entities that may be involved in wireless communications. Also, the terms "customer" and "user" may be used interchangeably, and may refer to a wireless service customer, a cell phone customer, and/or a user of a mobile device, as described herein above.

In an embodiment, a system and methods of refining an electronic information search is disclosed. When a user of a mobile device desires information, they may initiate a search, such as an internet search, in order to find the desired information. For example, a person driving a car in a town that they have never been to might want to locate a restaurant, in order to stop for a meal. The driver or a passenger might, via a mobile device such as a mobile phone, open a web browser program on the mobile device and initiate a search for restaurants. Using the system and methods of the disclosure, an application on the mobile device or on a server of the service provider of the mobile device may intercept the search as the user is attempting to send it, and may refine it to better serve the needs of the user. For example, the application may access a user profile of the user and may determine that the user likes a certain type of food, such as Mexican food. The user profile may be, for example, a file located in a memory to which the application has access.

The user profile file may contain relevant information of the user such as gender, age, a plurality of preference criteria related to various categories, and so on. The preference criteria may be, for example, a preferred location such as a preference for hotels located proximate to an airport, a preferred sporting activity, a favorite type of movie, a type of fuel required for a vehicle, a preferred travel destination, a preferred route to avoid certain types of roads, and a preference for particular type of accommodation such as a hotel preference. In an embodiment, the user profile may be stored on a mobile device, a server computer, or any other suitable location as may be appropriate for a given situation. The user profile may contain information pertaining to the user, and may or may not contain information about the mobile device such as type of mobile device, location of mobile device, or other information that is not particularly associated with the user.

The application further may access a clock function of the mobile device and determine that it is near noon, such that lunch would be an appropriate meal, given the time of day. The application also may access a global positioning satellite system (GPS) function of the mobile device and may determine that the approximate location of the mobile device (i.e. the user of the mobile device) is in the city of Kansas City, near downtown. The application then may add terms to the search such as "lunch", "Mexican food", "Kansas City", "downtown", and/or other appropriate terms to better define the search to meet the needs/desires of the user searching for a meal. The application may then forward the revised search, via a wireless network, to a search engine available on the internet (e.g. Google). The search engine then may search the internet for content related to the search terms and return one-or-more links to appropriate dining establishments, given the input provided by the application. In addition or alternatively, the application may prioritize the links, also based on the user profile. For example, the application may determine that some of the returned links are more suitable to the user, based on correlations with information in the user profile. The prioritizing may be by sorting, highlighting, providing metadata, or other method of prioritizing the links. The user then may view the results of the search, select an appropriate link from the search results, and select a restaurant at which to dine.

In another embodiment, a scenario that is similar to the previous embodiment may inspire a user to initiate a similar search. The user may likewise want to locate a local restaurant in which to stop and eat. In this embodiment, the user may initiate a search, which then may be forwarded to a search engine on the internet. When the search engine has performed the search and returned the results, an application on the mobile device or on a server of the provider of the mobile device may intercept the returned results and may manipulate the results to better fit the user profile of the mobile device user. For example, the application may parse the search results and/or sort the results to order them in a "most desirable" to "least desirable" order, or such. Alternatively or in combination, the application may highlight portions of the results that fit more closely to the user profile of the user. The user profile may indicate, as above, that the user is partial to Mexican food, that it is a time of day that would normally call for a lunch meal, and that the user is currently near downtown Kansas City. The application may peruse the search results and sort them in order of closest to the user's present location, Mexican restaurants first, and/or restaurants that serve lunch, etc. Alternatively, the application may highlight the more relevant portions of the search results by, for example, presenting them in bright red bolded text on the display of the mobile device, in order to draw the user's attention thereto.

Using the teachings of the disclosure, a provider may bring additional value to a customer by providing more targeted search results without necessarily having to enter into a business relationship with the search engine service, itself. The provider may be able to bring additional value to its customer by refining the search to comprehend information about the user to which the provider has access, and to which the search engine service does not. This may allow the provider to leverage this privileged information, without the need to share this information with the search engine service. For example, by monitoring, capturing, and storing information related to a customer, a provider may develop a profile of the customer that gives insight into the preferences of the customer. Customer preferences such as types of entertainment they enjoy, the types of food they like, their age and gender, where they live, and so forth may be used to help direct information searches in such a way as to make the customers' searches for information more efficient.

In general, search engines have access to a huge amount of content. This can be beneficial, in terms of finding a plethora of information, but it can also lead to information overload. For example, a search for a common term may produce such a great abundance of "hits" (i.e. search results) that an inquirer may find it tedious to sift through the results to find the information in which they are actually interested, which may be virtually obscured by the overwhelming abundance of results. Narrowing the search by adding additional search terms may return fewer search results, but this requires additional input from the user. In a scenario in which the user is driving, for example, the user may not wish to be distracted from operating their vehicle by having to enter numerous search terms. As such, the user may wish to enter as few terms as necessary, in order to prevent the user creating an unsafe driving condition. Alternatively, the user may opt to stop the vehicle at an appropriate location to enter the search, but may not want to spent more time than is necessary to do so, as it may delay their progress. The system and methods disclosed herein may provide search results that may be more appropriately directed to the needs and/or interests of the user, without requiring the additional work/input required to enter additional search terms. Thus, a customer may be able to more efficiently find information in a timely, less frustrating fashion.

Turning now to FIG. 1, a wireless communication system 100 is illustrated. The wireless communication system 100 comprises a portable communication device 102, an application 104, an automobile 106, a base transceiver station (BTS) 108, a network 110 such as the internet, a server computer 112, a service provider server computer 114, a search engine 116, and content 118. In an embodiment a user may employ one or more of many wireless devices in order to access the network 110. For example portable communication device 102 may be a mobile phone, a portable computer, a wireless-enabled automobile (e.g. automobile 106), or any such portable communication device, and may facilitate or otherwise provide access to the network 110, via BTS 108. Any of these or similar devices may communicate wirelessly over BTS 108 through network 110, to access resources such as server computer 112, and/or service provider server computer 114. A search engine, such as Bing, Google, and/or Yahoo may reside on a server computer such as server computer 112, thereby providing access to searches to a user of a mobile device as described above.

For example, a user of portable communication device 102 may notice that the fuel level in her/his automobile 106 indicates the need for fuel. Automobile 106 may be equipped with a head unit that may serve as portable communication device 102, and may thereby provide a variety of functionality, including wireless communications. This head unit may act as a bridge between shorter-range communications technologies such as Bluetooth and Wi-Fi communications systems. For example, the head unit may allow a user of a laptop computer or such to connect to longer range wireless communications systems by using the head unit as a bridge between the laptop computer's Bluetooth short-range communications system and its own, longer-range wireless communication system such as cellular wireless communications. The user therefore may want to locate a proximate refueling point such as a gas station. Via one of many user interfaces, such as a voice-activated user interface or a touch-screen user interface associated with the head unit of the automobile 106, the user may open a web browser and initiate a search for a gas station, in order to refuel before running out. The user may enter the search term "gas station", and may submit the search to search engine 116 located on server computer 112.

In an embodiment, the search submission may be intercepted by an application residing within the portable communication device 102. The application may invoke and/or access a user profile, which may reside for example in a memory of wireless-enabled automobile 106, and may insert relevant terms into the search. The user profile may be built by the user by inputting information into the profile, or may be a collection of information captured by a user profiling application and stored in a memory which is either located with- or-without making the user aware that the information is being captured. In an embodiment, the profiling application may provide the user with the ability to edit the collected information, and also may allow the user to "opt in" or "opt out" of the collecting of information by the user profiling application. In an embodiment, the user profile may comprise information about electronic purchases completed, at least in part, via the portable communication device 102. The user profile may comprise information about content access completed by the portable communication device 102. The user profile may comprise information about power cycles of the portable communication device 102. For example, the user profile may capture information about whether the portable communication device 102 is recharged timely or is instead occasionally or frequently allowed to fully discharge. The user profile may capture information about a number of voice calls, a number of text messages, and/or a number of data sessions completed by the portable communication device 102 per unit of time.

In an embodiment, the event of initiating a search may trigger the portable communication device 102 to dynamically construct a user profile from profile information stored on the portable communication device 102 and/or profile information stored in the service provider system, for example stored by the service provider server computer 114 and/or by a data store coupled to the service provider server computer 114. For example, some profile information may be provided by the service provider server computer 114 that is based on comparison of the behavior of the user of the portable electronic device 102 to a norm of behavior of a plurality of subscribers associated with the service provider. The service provider server computer 114 may provide other profile information based on processing other information related to the subscriber that is available to the service provider by virtue of the communication service account and communication usage of the portable communication device 102.

For example, the user profile may indicate that user's automobile 106 is a diesel vehicle, and may therefore insert a term (e.g. "diesel") into the search submission to indicate that the gas station must be able to provide diesel fuel. The user profile may further indicate that the user is frugal, and so the application may insert the term "best price" into the search submission, as well. The application also may access a GPS unit within wireless-enabled automobile 106 and may determine that wireless-enabled automobile 106 is traveling on Interstate 20, is heading east, and is 10 miles from downtown Kansas City. The application therefore may insert additional search terms such as "east bound", "interstate 20", and other appropriate terms to indicate the position of wireless-enabled automobile 106, in order to more appropriately return search results that better fit the needs of the user of wireless-enabled automobile 106. The application may then determine if there are aspects of the user profile that may indicate additional search terms to add, and having done so, the application may forward the search submission, via BTS 108, network 110, and server computer 112, to search engine 116.

Search engine 116 then may search for content 118 on the network 110 for related terms and collect search results such as URL's for gas stations located on Interstate 20, approximately 10 miles east of downtown Kansas City, on the eastbound side of the interstate. Search engine 1167 may assemble the resulting URL's and return them, via server computer 112, network 110, and BTS 108, back to portable communication device 102. Portable communication device 102 may then display the search results in a suitable manner, for example, on a display located on the dashboard of wireless-enabled automobile 106. Alternatively, portable communication device 102 may present information in an audible format, such as via a synthesized voice device as would be known to one of ordinary skill in the art. The user of portable communication device 102 then may peruse the results and select a gas station of his/her choice. In an embodiment, the selection then may be presented to a GPS function within portable communication device 102, which then may provide appropriate directions to the operator/user of portable communication device 102 6, in order to guide them to the destination of their choice.

In an alternative embodiment, the application that intercepts the search submission may be located on service provider server computer 114 or such, as opposed to residing within a memory of the portable communication device 102. In addition or alternatively, application 104 could be located anywhere along a communication path of the wireless communication system 100 or similar wireless communication system or components thereof.

Figure 2:
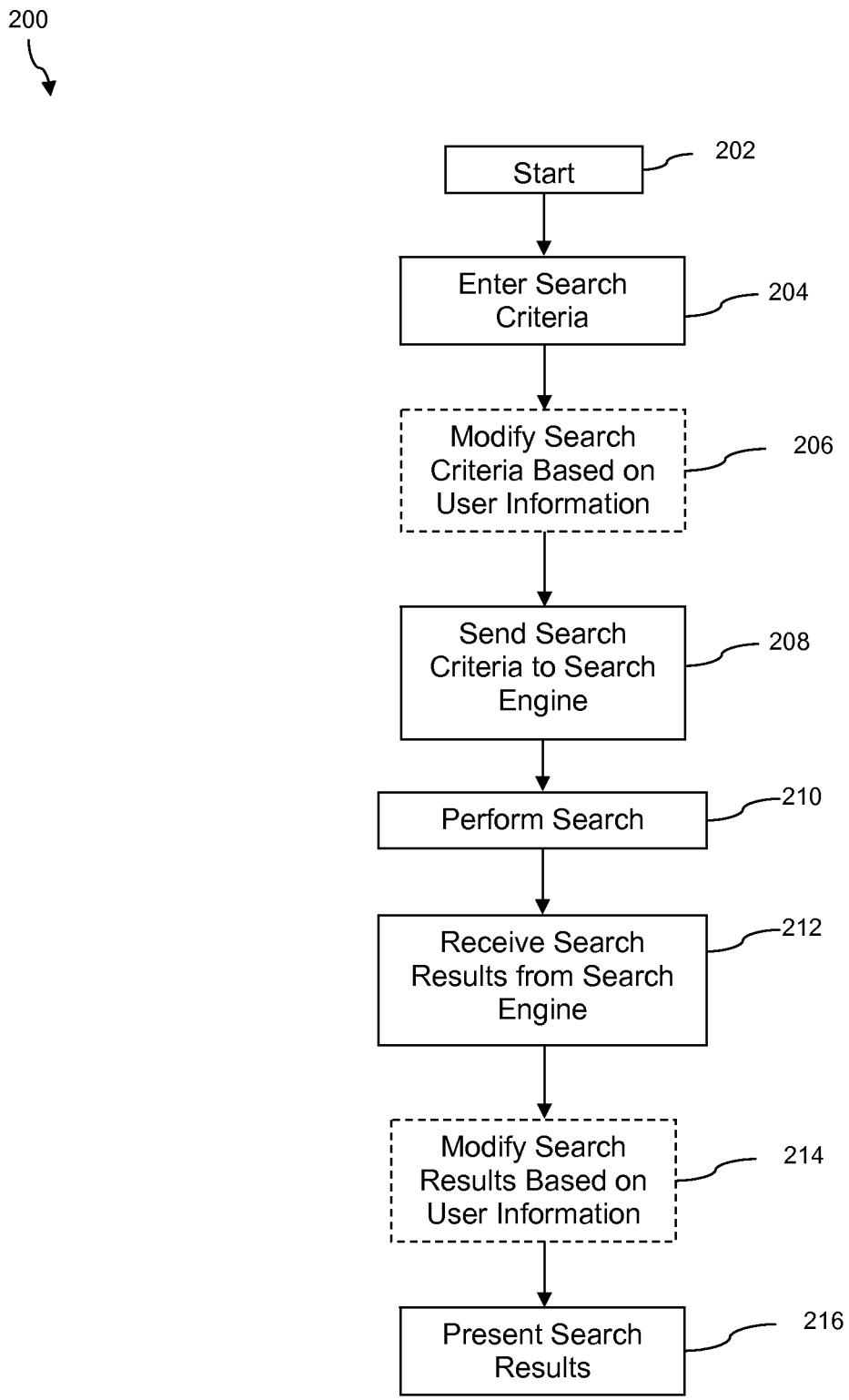
FIG. 2 illustrates a flowchart of a method, according to an embodiment of the disclosure.

Turning now to FIG. 2, a method 200 according to an embodiment of the disclosure is described. In step 202, the method begins. In step 204 search criteria are entered. The criteria may be a single term or multiple terms to be searched, as may be appropriate for a given situation. Search terms may be entered by any suitable method, and may be configured and arranged so as to produce a desired result. For example, given common protocols for search term syntax and construction, multiple terms may be provided with Boolean operators such as "and", "or", or "not". In addition or alternatively, term phrases such as two-word terms to provide more exact matching may be enclosed in quotation marks. In an embodiment, any form of search criteria may be entered in any form or fashion so as to produce desired results.

In optional step 206, the search criteria are modified based on user information. As described above, for example, an application may intercept the search criteria as they are being sent to a search engine and may add to, change, or otherwise modify the search terms to take into account user information in, for example, a user profile. In step 208, the search (or optionally the modified search) is sent to a search engine via an appropriate wireless communications path such as via BTS 108 and network 110. In step 210, the search engine performs the search, using the criteria described above. In step 212, the search engine returns the results of the search.

In optional step 214, the search results are modified by application 104, based on user information, such as information contained within a user profile. The returned results may be, for example, sorted, highlighted, parsed, culled, or otherwise modified so as to produce a search result or search result set that more appropriately reflects the needs of the user, based on user information contained within a user profile or the like. In step 216, the search results in their modified form are presented to the user for perusal. In an embodiment, the search criteria and/or the search results may be modified at any point in method 200, and/or at any location along the way, as may be appropriate in a given situation.

Figure 3:
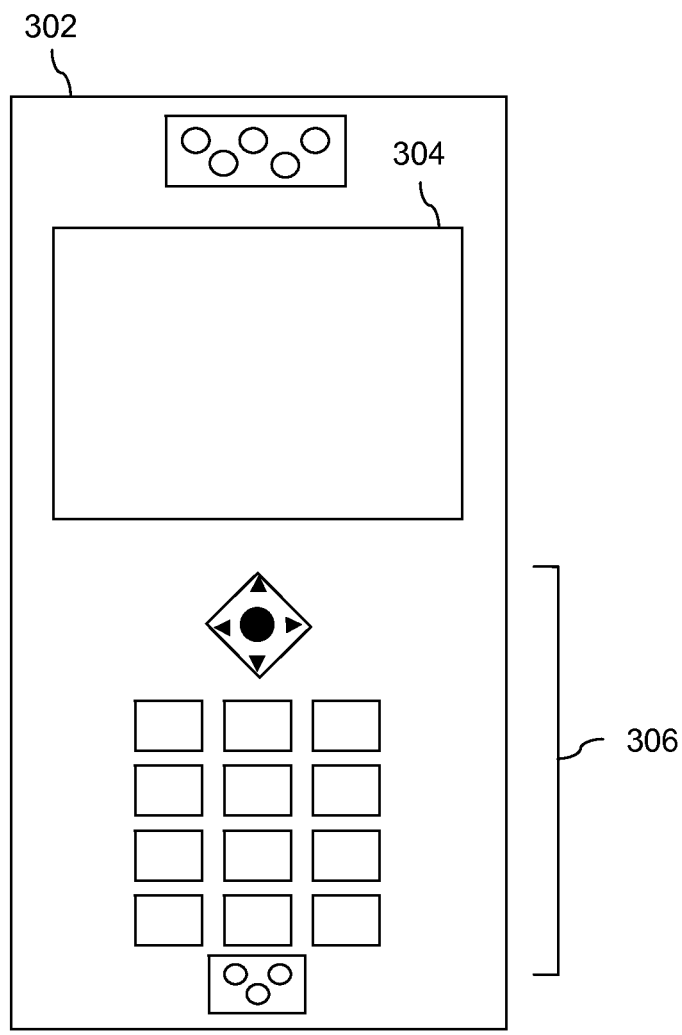
FIG. 3 illustrates a mobile device, according to an embodiment of the disclosure.

FIG. 3 illustrates a mobile device 302, which is operable for implementing aspects of the present disclosure, but the present disclosure should not be limited to these implementations. Though illustrated as a mobile phone, the mobile device 302 may take various forms including a wireless handset, a pager, a personal digital assistant (PDA), a gaming device, an inventory control device, a media player, a digital camera, a digital calculator, a head unit in a vehicle such as a car, truck, or motorcycle, a portable computer, a tablet computer, a laptop computer, and/or other. Many suitable handsets combine some or all of these functions. In some embodiments of the present disclosure, the mobile device 302 is not a general purpose computing device like a portable, laptop or tablet computer, but rather is a special-purpose communications device such as a mobile phone, wireless handset, pager, or PDA. The mobile device 302 may support specialized activities such as gaming, inventory control, job control, and/or task management functions, and so on.

The mobile device 302 includes a display 304 and a touch-sensitive surface and/or keys 306 for input by a user. The mobile device 302 may present options for the user to select, controls for the user to actuate, and/or cursors or other indicators for the user to direct. The mobile device 302 further may accept data entry from the user, including numbers to dial or various parameter values for configuring the operation of the handset. The mobile device 302 may further execute one or more software or firmware applications in response to user commands. These applications may configure the mobile device 302 to perform various customized functions in response to user interaction. Additionally, the mobile device 302 may be programmed and/or configured over-the-air, for example from a BTS, a wireless access point, a network, or a peer mobile device 302.

The mobile device 302 may execute a web browser application which enables the display 304 to show a web page. The web page may be obtained via wireless communications with a base transceiver station such as BTS 108, a wireless network access node, a peer mobile device 302 or any other wireless communication network or system. In some instances, the mobile device 302 may be in communication with multiple BTS 108 at the same time. Via the wireless link and the wired network, the mobile device 302 has access to information on various servers, such as server 112. The server 112 may provide content that may be shown on the display 304. Alternately, the mobile device 302 may access the BTS 108 through a peer mobile device 302 acting as an intermediary, in a relay type or hop type of connection.

Figure 4:
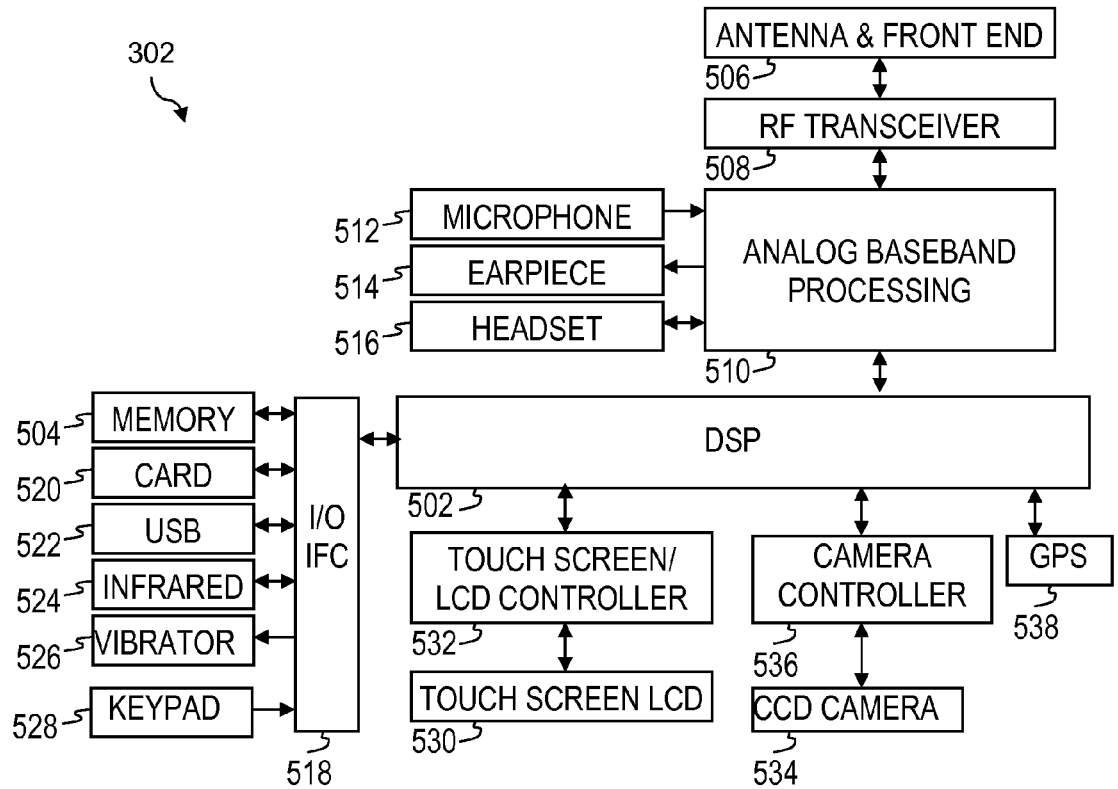
FIG. 4 illustrates a block diagram of a mobile device, according to an embodiment of the disclosure.

FIG. 4 shows a block diagram of the mobile device 302. While a variety of known components of mobile device 302 are depicted, in an embodiment a subset of the listed components and/or additional components not listed may be included in the mobile device 302. The mobile device 302 includes a digital signal processor (DSP) 502 and a memory 504. As shown, the mobile device 302 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 302 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 302 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the mobile device 302 to send and receive information from a radio access network (RAN) or some other available wireless communications network or from a peer mobile device 302. In an embodiment, the antenna and front end unit 506 may include multiple antennas to support beam forming and/or multiple input multiple output (MIMO) operations. As is known to those skilled in the art, MIMO operations may provide spatial diversity which may be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF transceiver 508, portions of the antenna and front end 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset port 516 and outputs to the earpiece speaker 514 and the headset port 516. To that end, the analog baseband processing unit 510 may have ports for connecting to the built-in microphone 512 and the earpiece speaker 514 that enable the mobile device 302 to be used as a mobile phone. The analog baseband processing unit 510 further may include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 302 to function as a peripheral device to exchange information with a personal computer or other computer system. The infrared port 524 and other optional ports such as a Bluetooth interface or an IEEE 802.11 compliant wireless interface may enable the mobile device 302 to communicate wirelessly with other nearby handsets and/or wireless base stations.

The input/output interface 518 may further connect the DSP 502 to the vibrator 526 that, when triggered, causes the mobile device 302 to vibrate. The vibrator 526 may serve as a mechanism for silently alerting the user to any of various events such as an incoming call, a new text message, and an appointment reminder.

The keypad 528 couples to the DSP 502 via the interface 518 to provide one mechanism for the user to make selections, enter information, and otherwise provide input to the mobile device 302. Another input mechanism may be the touch screen LCD 530, which may also display text and/or graphics to the user. The touch screen LCD controller 532 couples the DSP 502 to the touch screen LCD 530.

The CCD camera 534 enables the mobile device 302 to take digital pictures. The DSP 502 communicates with the CCD camera 534 via the camera controller 536. The GPS sensor 538 is coupled to the DSP 502 to decode global positioning system signals, thereby enabling the mobile device 302 to determine its position. In another embodiment, a camera operating according to a technology other than charge coupled device cameras may be employed. Various other peripherals may also be included to provide additional functions, e.g., radio and television reception.

Figure 5:
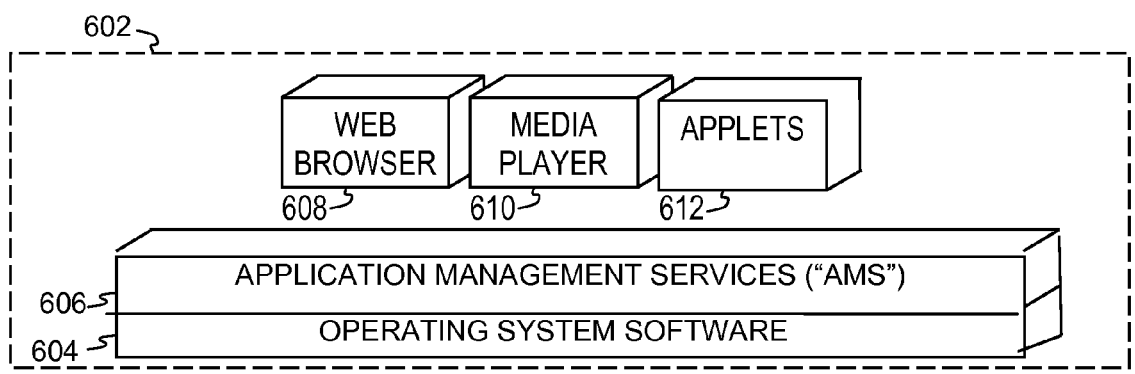
FIG. 5 illustrates a software environment, according to an embodiment of the disclosure.

FIG. 5 illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 302. Also shown in FIG. 5 are a web browser application 608, a media player application 610, and JAVA applets 612. The web browser application 608 configures the mobile device 302 to operate as a web browser, allowing a user to enter information into forms and select links to retrieve and view web pages. The media player application 610 configures the mobile device 302 to retrieve and play audio or audiovisual media. The JAVA applets 612 configure the mobile device 302 to provide games, utilities, and other functionality.

Figure 6:
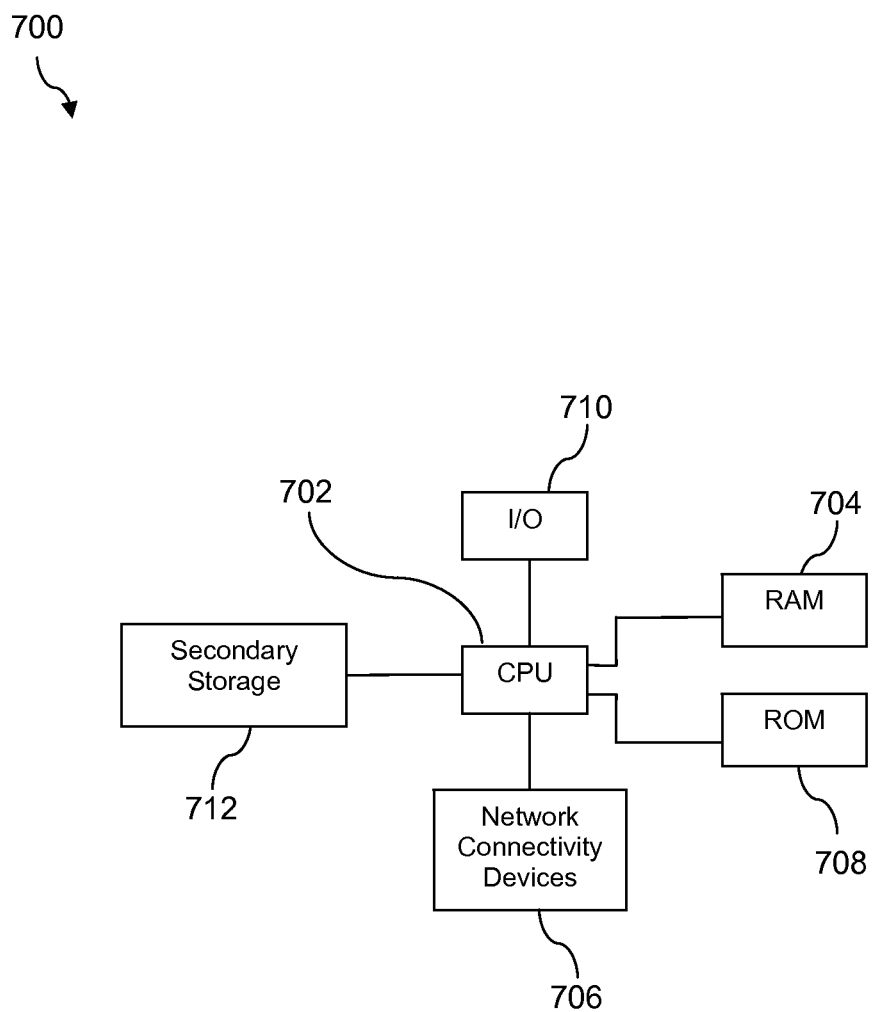
FIG. 6 illustrates a computer system, according to an embodiment of the disclosure.

FIG. 6 illustrates a computer system 700 suitable for implementing one or more embodiments disclosed herein. The computer system 700 includes a processor 702 (which may be referred to as a central processor unit or CPU) that is in communication with memory devices including secondary storage 712, read only memory (ROM) 708, random access memory (RAM) 704, input/output (I/O) devices 710, and network connectivity devices 706. The processor 702 may be implemented as one or more CPU chips.

It is understood that by programming and/or loading executable instructions onto the computer system 700, at least one of the CPU 702, the RAM 704, and the ROM 708 are changed, transforming the computer system 700 in part into a particular machine or apparatus having the novel functionality taught by the present disclosure. It is fundamental to the electrical engineering and software engineering arts that functionality that may be implemented by loading executable software into a computer may be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 712 is typically comprised of one or more disk drives or tape drives and is used for non-volatile storage of data and as an over-flow data storage device if RAM 704 is not large enough to hold all working data. Secondary storage 712 may be used to store programs which are loaded into RAM 704 when such programs are selected for execution. The ROM 708 is used to store instructions and perhaps data which are read during program execution. ROM 708 is a non-volatile memory device which typically has a small memory capacity relative to the larger memory capacity of secondary storage 712. The RAM 704 is used to store volatile data and perhaps to store instructions. Access to both ROM 708 and RAM 704 is typically faster than to secondary storage 712. The secondary storage 712, the RAM 704, and/or the ROM 708 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 706 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 706 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embodied in the carrier wave generated by the network connectivity devices 706 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 712), ROM 708, RAM 704, or the network connectivity devices 706. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 712, for example, hard drives, floppy disks, optical disks, and/or other device, the ROM 708, and/or the RAM 704 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 712, to the ROM 708, to the RAM 704, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 706. The computer program product may comprise instructions that promote the loading and/or copying of data, data structures, files, and/or executable instructions to the secondary storage 712, to the ROM 708, to the RAM 704, and/or to other non-volatile memory and volatile memory of the computer system 700.

In some contexts, a baseband signal and/or a signal embodied in a carrier wave may be referred to as a transitory signal. In some contexts, the secondary storage 712, the ROM 708, and the RAM 704 may be referred to as a non-transitory computer readable medium or a computer readable storage media. A dynamic RAM embodiment of the RAM 704, likewise, may be referred to as a non-transitory computer readable medium in that while the dynamic RAM receives electrical power and is operated in accordance with its design, for example during a period of time during which the computer 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of refining a search comprising:
   receiving, by a mobile communication device, a user input, the user input defining a search request;
   intercepting, by the mobile communication device, the search request;
   refining, by the mobile communication device, the intercepted search request based on a user profile associated with a user of the mobile communication device and stored on the mobile communication device, wherein the user profile comprises information about the user's use of the mobile communication device that is monitored and captured by a provider of mobile communication services, and wherein the information about the user's use of the mobile communication device comprises one or more of information about electronic purchases completed at least in part by the mobile communication device, information about power cycles of the mobile communication device, a number of voice calls, or a number of text messages;
   sending, by the mobile communication device, the refined search request to a search engine;
   receiving, by the mobile communication device, a search result from the search engine; and
   displaying, by the mobile communication device, the search result.

2. The method of claim 1, wherein refining the search request comprises adding search terms to the search request.

3. The method of claim 1, wherein displaying the search result further comprises displaying a prioritized list of links to content.

4. The method of claim 1, wherein the information is monitored and captured by the provider without user awareness via a user profiling application executing on the mobile communication device.

5. The method of claim 1, wherein the information about the user's use of the mobile communication device further comprises one or more of information about content access completed by the mobile communication device, or a number of data sessions completed by the mobile communication device.

6. The method of claim 1, wherein the user profile comprises a user criterion, and wherein the user criterion comprises one or more of a user gender, a user age, a user demographic, and a user preference.

7. The method of claim 6, wherein the user preference comprises one or more of a dining preference, a sports preference, a movie preference, a fuel preference, a location preference, a travel preference, a route preference, and an accommodations preference.

8. A mobile communication device for refining search results comprising:
   a radio transceiver;
   a memory;
   a processor coupled to the memory; and
   an application stored in the memory of the mobile communication device that, when executed by the processor:
      receives a user input, the user input defining a search request;
      sends the search request via the radio transceiver to a search engine;
      intercepts a search result from the search engine;
      refines the intercepted search result based at least on a user profile associated with a user of the mobile communication device and stored on the mobile communication device, wherein the user profile comprises information about the user's use of the mobile communication device that is monitored and captured by a provider of mobile communication services, and wherein the information about the user's use of the mobile communication device comprises one or more of information about electronic purchases completed at least in part by the mobile communication device, information about power cycles of the mobile communication device, a number of voice calls, or a number of text messages; and
      displays the refined search result on the mobile communication device.

9. The mobile communication device of claim 8, wherein the application refines the search result based on a user profile associated with a second mobile device, the second mobile device being proximate to the mobile communication device.

10. The mobile communication device of claim 8, wherein the search result further comprises a plurality of links to content, and wherein the application further prioritizes the plurality of links based at least in part on the user profile.

11. The mobile communication device of claim 8, wherein the user profile comprises one or more of a user gender, a user age, a user demographic, and a user preference.

12. The mobile communication device of claim 11, wherein the user preference comprises one or more of a dining preference, a sports preference, a movie preference, a fuel preference, a location preference, a travel preference, a route preference, and an accommodations preference.

13. A method of refining a search comprising:
receiving, by a mobile communication device, a user input, the user input defining a search request;
sending, by the mobile communication device, the search request to a search engine;
intercepting, by the mobile communication device, a search result from the search engine;
refining, by the mobile communication device, the intercepted search result based at least on a user profile associated with a user of the mobile communication device and stored on the mobile communication device, wherein the user profile comprises information about the user's use of the mobile communication device that is monitored and captured by a provider of mobile communication services, and wherein the information about the user's use of the mobile communication device comprises one or more of information about electronic purchases completed at least in part by the mobile communication device, information about power cycles of the mobile communication device, a number of voice calls, or a number of text messages; and
displaying, by the mobile communication device, the refined search result.

14. The method of claim 13, wherein the search result comprises a plurality of links to content.

15. The method of claim 14, wherein the user profile comprises one or more of a user gender, a user age, a user demographic, and a user preference, and wherein the refining is based on a determination of one or more of a time of day, a user location, and a day of the week.

16. The method of claim 15, wherein the user preference comprises one or more of a dining preference, a sports preference, a movie preference, a fuel preference, a location preference, a travel preference, a route preference, and an accommodations preference.

17. The method of claim 13, wherein the search result comprises at least one link to content, and wherein when the search result comprises more than one link to content, prioritizing the links based on a user preference.

18. The method of claim 17, wherein prioritizing the links comprises sorting the links, highlighting the links, and embedding navigational aids to filter the links.

19. The method of claim 18, wherein the mobile communication device further refines the search result based on a user profile of a nearby second mobile communication device.

* * * * *